(12) United States Patent
Nicholson et al.

(10) Patent No.: US 10,364,805 B2
(45) Date of Patent: *Jul. 30, 2019

(54) BI-DIRECTIONAL ROTARY SHAPE MEMORY ALLOY ELEMENT ACTUATOR ASSEMBLIES, AND SYSTEMS AND METHODS INCLUDING THE SAME

(71) Applicant: The Boeing Company, Chicago, IL (US)

(72) Inventors: Douglas E. Nicholson, Saint Louis, MO (US); Micheal Bass, Saint Louis, MO (US); James Henry Mabe, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,252

(22) Filed: Dec. 5, 2017

(65) Prior Publication Data

US 2018/0094623 A1   Apr. 5, 2018

Related U.S. Application Data

(63) Continuation of application No. 15/163,011, filed on May 24, 2016, now Pat. No. 9,897,078.

(51) Int. Cl.
*F03G 7/06* (2006.01)
*G01M 9/02* (2006.01)
*G01M 9/08* (2006.01)

(52) U.S. Cl.
CPC ............... *F03G 7/065* (2013.01); *G01M 9/02* (2013.01); *G01M 9/08* (2013.01)

(58) Field of Classification Search
None
See application file for complete search history.

(56) References Cited

U.S. PATENT DOCUMENTS 4,284,254 A   8/1981 Rieben
4,700,541 A   10/1987 Gabriel et al.
(Continued)

FOREIGN PATENT DOCUMENTS

EP   1130257   9/2001
EP   2 484 586   8/2012
(Continued)

OTHER PUBLICATIONS

Machine-generated English translation of the abstract of FR 2 862 353, downloaded from European Patent Office website Apr. 9, 2015.
(Continued)

*Primary Examiner* — Peter J Macchiarolo
*Assistant Examiner* — Jermaine L Jenkins
(74) *Attorney, Agent, or Firm* — Dascenzo Intellectual Property Law, P.C.

(57) ABSTRACT

Rotary actuator assemblies, wind tunnels including the same, and associated methods are disclosed. A rotary actuator assembly includes a rotary element and a rotary actuator with a shape memory alloy element. The rotary actuator is configured to generate a first torque and a second torque in opposing rotary directions to rotate the rotary element. A rotary actuator assembly further includes an assist magnetic element and a receiver magnetic element configured to generate a magnetic force therebetween. Wind tunnels include an aerodynamic model with a rotary actuator assembly to rotate a portion of the aerodynamic model with respect to an airstream in a chamber. A method of rotating a rotary element includes modulating a temperature of a shape memory alloy element and applying a supplemental torque to the rotary element with an assist magnetic element and a receiver magnetic element.

20 Claims, 2 Drawing Sheets

(56) References Cited

U.S. PATENT DOCUMENTS

| | | | |
|---|---|---|---|
| 5,127,228 A | 7/1992 | Swenson | |
| 5,150,864 A | 9/1992 | Roglin et al. | |
| 6,065,934 A | 5/2000 | Jacot et al. | |
| 6,226,992 B1 | 5/2001 | Kutlucinar et al. | |
| 6,499,952 B1 | 12/2002 | Jacot et al. | |
| 7,037,076 B2 * | 5/2006 | Jacot | F03G 7/065 416/155 |
| 7,481,054 B2 | 1/2009 | Hageman et al. | |
| 7,723,896 B2 | 5/2010 | Esashi et al. | |
| 7,788,921 B2 | 9/2010 | Takahashi | |
| 7,810,326 B2 * | 10/2010 | Taya | H02N 2/10 310/307 |
| 7,878,459 B2 | 2/2011 | Mabe et al. | |
| 8,104,278 B2 | 1/2012 | Browne et al. | |
| 8,118,264 B2 | 2/2012 | Mabe et al. | |
| 8,220,259 B1 | 7/2012 | Cripe et al. | |
| 8,876,046 B2 | 11/2014 | Gunter et al. | |
| 9,046,082 B2 | 6/2015 | Jee | |
| 9,677,968 B2 | 6/2017 | Griffiths et al. | |
| 9,897,078 B2 * | 2/2018 | Nicholson | F03G 7/065 |
| 9,989,040 B2 | 6/2018 | Hallila | |
| 2002/0185932 A1 | 12/2002 | Gummin et al. | |
| 2003/0053912 A1 | 3/2003 | Jacot et al. | |
| 2003/0215804 A1 | 11/2003 | DeBeer et al. | |
| 2004/0261411 A1 | 12/2004 | MacGregor | |
| 2009/0143730 A1 | 6/2009 | DePolo et al. | |
| 2009/0167108 A1 | 7/2009 | Yang | |
| 2009/0179109 A1 | 7/2009 | Akkermann et al. | |
| 2012/0292155 A1 | 11/2012 | Gunter | |
| 2013/0046285 A1 | 2/2013 | Griffin et al. | |
| 2014/0331665 A1 | 11/2014 | Shivashankara et al. | |

FOREIGN PATENT DOCUMENTS

| | | |
|---|---|---|
| FR | 2 862 353 | 11/2003 |
| JP | 06 249129 | 9/1994 |
| WO | WO 01/16484 | 3/2001 |

OTHER PUBLICATIONS

Machine-generated English translation of the abstract of JP 06 249129, downloaded from European Patent Office website Apr. 9, 2015.

* cited by examiner

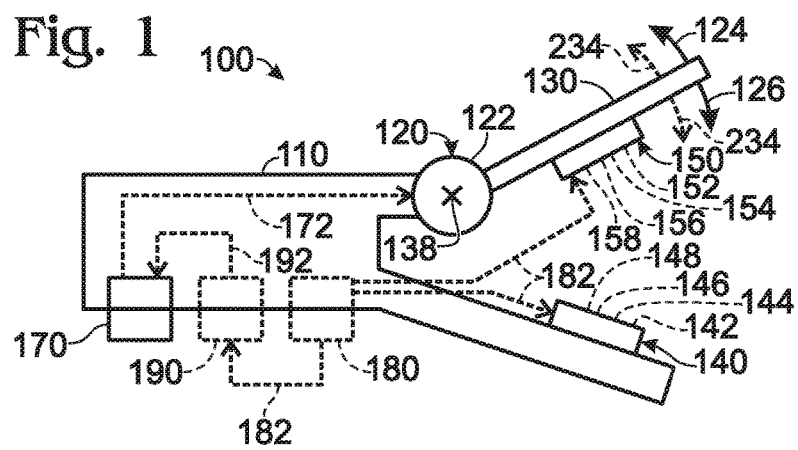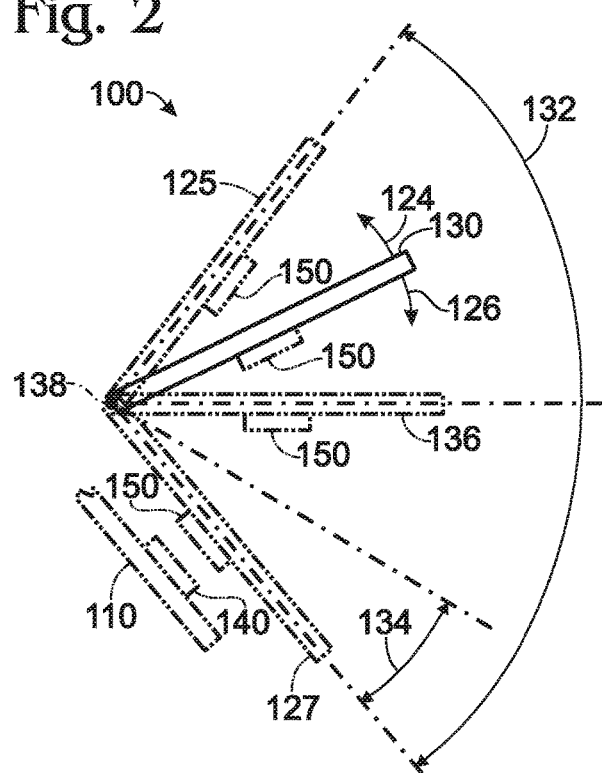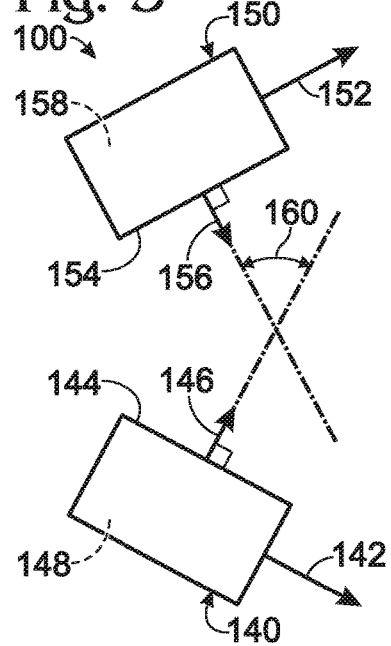

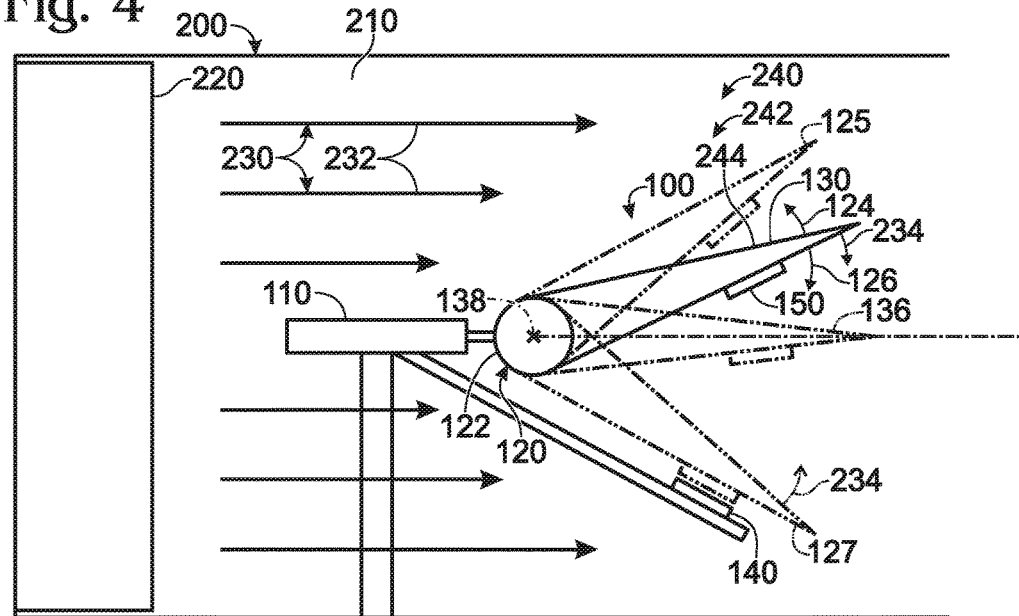
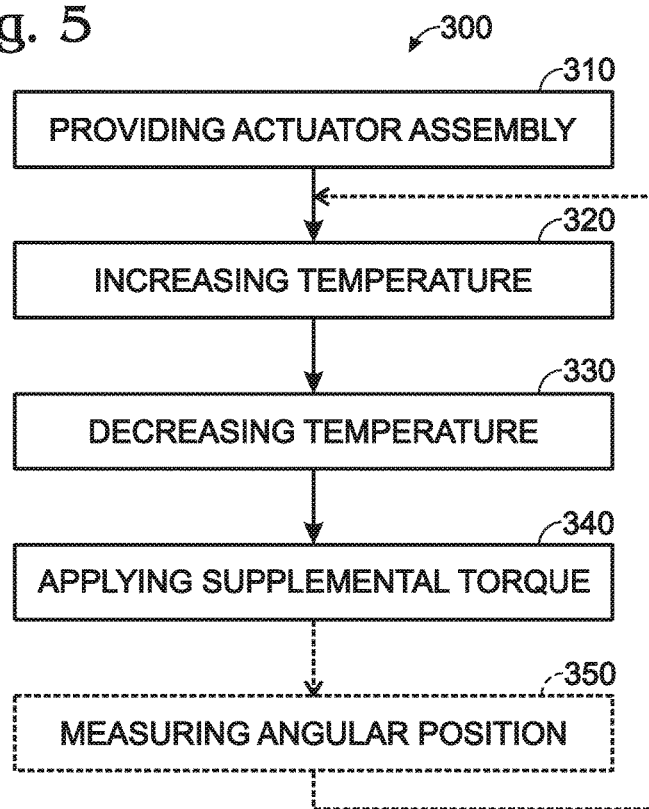

BI-DIRECTIONAL ROTARY SHAPE MEMORY ALLOY ELEMENT ACTUATOR ASSEMBLIES, AND SYSTEMS AND METHODS INCLUDING THE SAME

RELATED APPLICATION

This application is a continuation of, and claims priority under 35 USC § 121 to, U.S. patent application Ser. No. 15/163,011, entitled "BI-DIRECTIONAL ROTARY SHAPE MEMORY ALLOY ELEMENT ACTUATOR ASSEMBLIES, AND SYSTEMS AND METHODS INCLUDING THE SAME," and filed on May 24, 2016.

FIELD

The present disclosure relates to bi-directional rotary shape memory element alloy actuator assemblies, and systems and methods including the same.

BACKGROUND

Shape memory alloys may be utilized in rotary actuators to provide a torque to rotate an object against an applied load with a minimum of moving parts. For example, a shape memory alloy element may physically transform from a first configuration to a second configuration upon being heated, such that the transition from the first configuration to the second configuration includes a rotary motion and/or generates the torque, which may be harnessed to rotate a rotary element from a first rotary position to a second rotary position. To return the rotary element to the first position from the second position after heating the shape memory alloy element, traditional shape memory alloy actuators simply may be cooled.

A shape memory alloy element may be trained to exhibit a two-way shape memory effect, in which the shape memory alloy element may reversibly and repeatedly operate between a first, or cold, configuration and a second, or hot, configuration without an external bias source. For example, a shape memory alloy element may be trained to exhibit a two-way shape memory effect so as to reversibly and repeatedly rotate a control surface of an aerodynamic model with respect to an airstream in a wind tunnel. While the two-way shape memory effect generally is stable under external loads applied in the training direction (i.e., the direction toward the cold configuration), applying a load in a direction opposite the training direction may result in a degradation of the two-way shape memory effect, and a shape memory alloy receiving such a load may lose an ability to return to its cold configuration. Thus, there exists a need for improved bi-directional rotary shape memory alloy element actuator assemblies, and systems and methods including the same.

SUMMARY

Bi-directional rotary shape memory alloy element actuator assemblies, wind tunnels including the same, and associated methods are disclosed.

A bi-directional rotary shape memory alloy element actuator assembly includes an actuator mount, a rotary actuator coupled to the actuator mount, and a rotary element coupled to the rotary actuator. The rotary actuator is configured to generate a first torque in a first rotary direction and a second torque in a second rotary direction that is opposite the first rotary direction. The rotary element has an angular position in an angular range of motion, and is configured to rotate with respect to the actuator mount in the first rotary direction responsive to receipt of the first torque from the rotary actuator and to rotate with respect to the actuator mount in the second rotary direction responsive to receipt of the second torque from the rotary actuator. A bi-directional rotary shape memory alloy element actuator assembly further includes an assist magnetic element mounted to the actuator mount, a receiver magnetic element mounted to the rotary element, and a thermal control unit configured to regulate a temperature of at least a portion of the rotary actuator. The rotary actuator includes a shape memory alloy element configured to generate the first torque and the second torque responsive to the thermal control unit regulating a temperature of the shape memory alloy element. The assist magnetic element and the receiver magnetic element are configured to generate a magnetic force therebetween when the angular position of the rotary element is in a subset of the angular range of motion, which may be referred to herein as a magnetic assist portion of the angular range of motion.

A method of rotating a rotary element in two rotary directions through an angular range of motion includes increasing a temperature of a shape memory alloy element to rotate the rotary element in a first rotary direction, decreasing the temperature of the shape memory alloy element to rotate the rotary element in a second rotary direction, and applying a supplemental torque to the rotary element with an assist magnetic element and a receiver magnetic element when an angular position of the rotary element is in a magnetic assist portion of an angular range of motion of the rotary element.

A wind tunnel for testing an aerodynamic model includes a chamber extending in a longitudinal direction, an airstream source configured to generate an airstream in the chamber with a flow direction generally parallel to the longitudinal direction, and an aerodynamic model positioned in the chamber to receive an aerodynamic load from the airstream. The aerodynamic model includes a bi-directional rotary shape memory alloy element actuator assembly configured to rotate a portion of the aerodynamic model with respect to the airstream flow direction to test an aerodynamic property of the aerodynamic model.

BRIEF DESCRIPTION OF THE DRAWINGS

FIG. 1 is a schematic illustration representing actuator assemblies according to the present disclosure.

FIG. 2 is a schematic illustration representing a portion of actuator assemblies according to the present disclosure.

FIG. 3 is a schematic illustration representing a portion of actuator assemblies according to the present disclosure.

FIG. 4 is a schematic illustration representing wind tunnels according to the present disclosure.

FIG. 5 is a flowchart schematically representing methods of operating actuator assemblies according to the present disclosure.

DESCRIPTION

Bi-directional rotary shape memory alloy element actuator assemblies, wind tunnels including the same, and associated methods are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically illustrated in FIG. 1, an actuator assembly 100 for rotating a rotary element 130 includes an actuator mount 110, a rotary actuator 120 coupled to actuator mount 110, rotary element 130 coupled to rotary actuator 120, an assist magnetic element 140 mounted on actuator mount 110, and a receiver magnetic element 150 mounted on rotary element 130. Rotary actuator 120 is configured to generate a first torque in a first rotary direction 124 and a second torque in a second rotary direction 126 that is opposite first rotary direction 124. Specifically, rotary element 130 is configured to rotate with respect to actuator mount 110 in first rotary direction 124 responsive to receipt of the first torque from rotary actuator 120 and to rotate with respect to actuator mount 110 in second rotary direction 126 responsive to receipt of the second torque from rotary actuator 120. Rotary element 130 may be configured to receive an external load force 234, which may apply a torque to rotary element 130 in first rotary direction 124 and/or second rotary direction 126, and rotary actuator 120 may be configured to rotate rotary element 130 in a direction opposite a direction of external load force 234.

FIG. 1 schematically illustrates actuator assemblies 100 according to the present disclosure, while FIGS. 2-3 schematically illustrate positional relationships and ranges of components of actuator assemblies 100. Specifically, FIG. 2 schematically illustrates a rotational orientation of rotary element 130 in isolation, and FIG. 3 schematically illustrates a relative orientation of assist magnetic element 140 and receiver magnetic element 150 in isolation. Hence, FIGS. 2-3 may be understood as schematic representations of aspects of actuator assembly 100 of FIG. 1, and are not limiting with respect to actuator assemblies 100 according to the present disclosure.

As illustrated in FIG. 1, actuator assembly 100 further includes a thermal control unit 170 configured to regulate a temperature of at least a portion of rotary actuator 120. For example, thermal control unit 170 may transmit a thermal control signal 172 to at least a portion of rotary actuator 120. Rotary actuator 120 includes a shape memory alloy element 122 configured to generate the first torque and the second torque responsive to thermal control unit 170 regulating a temperature of shape memory alloy element 122. For example, rotary actuator 120 may include and/or be a torsional rotary actuator, and/or shape memory alloy element 122 may include and/or be a shape memory alloy torque tube.

With reference to FIG. 2, Rotary element 130 may be configured to rotate about a pivot point 138, and may be described by an angular position that is continuously variable within an angular range of motion 132. Rotary actuator 120 and/or shape memory alloy element 122 may be disposed at pivot point 138. However, this is not required, and it is within the scope of the present disclosure that rotary actuator 120 and/or shape memory alloy element 122 may not be disposed at, overlapping with, and/or coincident with pivot point 138. For example, actuator assembly 100 and/or rotary actuator 120 may include a mechanical linkage configured to transmit the first torque and/or the second torque from shape memory alloy element 122 to rotary element 130, with shape memory alloy element 122 being disposed away from, spaced-apart from, spatially removed from, and/or not coextensive with, pivot point 138.

The angular position of rotary element 130 may be measured with respect to a neutral position 136, which may be any appropriate angular position within angular range of motion 132. That is, neutral position 136 may be arbitrarily determined and/or defined within angular range of motion 132, and/or may correspond to an angular position within angular range of motion 132 at which rotary element 130 is in a particular configuration and/or receives a particular external load force 234. As an example, neutral position 136 may be an angular position within angular range of motion 132 at which rotary element 130 receives a minimum external load force 234. As a more specific example, and as illustrated in FIG. 4, load force 234 may be an aerodynamic load force 234, and neutral position 136 may be an angular position within angular range of motion 132 at which rotary element 130 receives a minimum aerodynamic load force 234 from an airstream 230.

With reference to FIG. 1, and as discussed herein, actuator assembly 100 additionally may include a status signal generator 180 that may be configured to generate and/or transmit a status signal 182, which may include information regarding a condition of actuator assembly 100. Status signal generator 180 may transmit status signal 182 to a feedback control unit 190, which in turn may be configured to deliver a feedback control signal 192 to thermal control unit 170, such as to regulate the angular position of rotary element 130 responsive to status signal 182.

Assist magnetic element 140 and receiver magnetic element 150, which are illustrated in FIG. 1, are configured to generate a magnetic force therebetween when the angular position of rotary element 130 is in a magnetic assist portion 134 of angular range of motion 132, which is a subset of angular range of motion 132 and is illustrated in FIG. 2. With reference to FIGS. 1 and 3, and as described herein, assist magnetic element 140 may have an assist magnetic moment 142, an assist element surface 144, and/or an assist element normal direction 146, and/or may include an assist electromagnet control unit 148. Similarly, receiver magnetic element 150 may have a receiver magnetic moment 152, a receiver element surface 154, and/or a receiver element normal direction 156, and/or may include a receiver electromagnet control unit 158. FIG. 3 schematically illustrates a geometrical relationship between components and/or properties of assist magnetic element 140 and receiver magnetic element 150 of FIG. 1 in an illustrative and non-limiting manner, and it is within the scope of the present disclosure that assist magnetic element 140 and receiver magnetic element 150 have any appropriate form and/or configuration.

The magnetic force generated between assist magnetic element 140 and receiver magnetic element 150 may be an attractive magnetic force, and/or may be configured to bias rotary element 130 and/or receiver magnetic element 150 toward assist magnetic element 140. For example, the magnetic force generated between assist magnetic element 140 and receiver magnetic element 150 may apply a supplemental torque to rotary element 130 that serves to bias rotary element 130 toward second rotary direction 126.

Magnetic assist portion 134 of angular range of motion 132 may be any appropriate subset and/or proportion of angular range of motion 132. For example, magnetic assist portion 134 may include at least 5%, at least 10%, at least 20%, at least 30%, at least 40%, at least 50%, at least 60%, at least 70%, at most 75%, at most 65%, at most 55%, at most 45%, at most 35%, at most 25%, at most 15%, and/or at most 7% of angular range of motion 132. Thus, the magnetic force between assist magnetic element 140 and receiver magnetic element 150 does not serve to bias rotary element 130 toward second rotary direction 126 over an entire extent of angular range of motion 132, and instead serves to bias rotary element 130 toward second rotary direction 126 only when assist magnetic element 140 and receiver magnetic element 150 are sufficiently proximal one another.

Magnetic assist portion 134 of angular range of motion 132 may be defined and/or characterized by a magnitude of the magnetic force between assist magnetic element 140 and receiver magnetic element 150. For example, the magnetic force between assist magnetic element 140 and receiver magnetic element 150 may be less than a threshold magnetic force when the angular position of rotary element 130 is outside magnetic assist portion 134 of angular range of motion 132. Specifically, the magnetic force between assist magnetic element 140 and receiver magnetic element 150 may be a maximum magnetic force when the angular position of rotary element 130 minimizes a separation distance between assist magnetic element 140 and receiver magnetic element 150, and the threshold magnetic force may be at most 10%, at most 9%, at most 8%, at most 7%, at most 6%, at most 5%, at most 4%, at most 3%, at most 2%, at most 1%, and/or at most 0.5% of a magnitude of the maximum magnetic force.

Shape memory alloy element 122 may include and/or be any suitable element, substance, and/or device configured to generate both the first torque and the second torque. For example, shape memory alloy element 122 may be configured and/or trained to exhibit a two-way shape memory effect. As more specific examples, shape memory alloy element 122 may include and/or be a binary alloy, a binary metal alloy, a nickel-titanium alloy, a binary nickel-titanium alloy, a ternary alloy, a ternary alloy that includes nickel and titanium and further includes hafnium, copper, iron, silver, cobalt, chromium, or vanadium, and/or a quaternary alloy. Specifically, shape memory alloy element 122 may be configured to transform from a martensite state to an austenite state responsive to thermal control unit 170 increasing the temperature of shape memory alloy element 122, and may be configured to transform from the austenite state to the martensite state responsive to thermal control unit 170 decreasing the temperature of shape memory alloy element 122 and/or permitting shape memory alloy element 122 to cool. As used herein, the martensite state of shape memory alloy element 122 also may be referred to as a martensite configuration, a first state, a first configuration, a cold state, and/or a cold configuration of shape memory alloy element 122. Additionally or alternatively, as used herein, the austenite state of shape memory alloy element 122 also may be referred to as an austenite configuration, a second state, a second configuration, a hot state, and/or a hot configuration of shape memory alloy element 122.

A transformation of shape memory alloy element 122 from the martensite state to the austenite state may correspond to rotary actuator 120 generating the first torque in first rotary direction 124. Similarly, a transformation of shape memory alloy element 122 from the austenite state to the martensite state may correspond to rotary actuator 120 generating the second torque in second rotary direction 126. Stated differently, rotary actuator 120 may rotate in first rotary direction 124 when shape memory alloy element 122 transforms from the martensite state to the austenite state, and/or may rotate in second rotary direction 126 when shape memory alloy element 122 transforms from the austenite state to the martensite state.

Rotary element 130 may be configured to rotate in each of first rotary direction 124 and second rotary direction 126 responsive to torsional forces applied to rotary element 130 by rotary actuator 120 alone. That is, rotary element 130 may be configured to rotate in each of first rotary direction 124 and second rotary direction 126 without receiving a rotary force from an external bias source that is external actuator assembly 100. Stated differently, rotary element 130 may be configured to rotate in first rotary direction 124 when the only torsional force applied to rotary element 130 is the first torque applied by rotary actuator 120, and may be configured to rotate in second rotary direction 126 when the only torsional force applied to rotary element 130 is the second torque applied by rotary actuator 120. Stated yet another way, rotary actuator 120 may include only one shape memory alloy element 122 configured to generate both the first torque and the second torque, and/or may be configured to rotate rotary element 130 in a direction that is opposite a direction of a load applied by an external bias source.

When shape memory alloy element 122 is configured and/or trained to exhibit the two-way shape memory effect as described, rotary actuator 120 may be configured to apply the first torque and the second torque to rotary element 130 such that the first torque is of a generally greater magnitude than the second torque. Specifically, rotary actuator 120 may be configured to apply the first torque to rotary element 130 in first rotary direction 124 when shape memory alloy element 122 transforms from the martensite state to the austenite state, and may be configured to apply the second torque to rotary element 130 in second rotary direction 124 when shape memory alloy element 122 transforms from the austenite state to the martensite state, such that a first magnitude of the first torque is greater than a second magnitude of the second torque. In such a configuration, the magnetic force generated between assist magnetic element 140 and receiver magnetic element 150 may generate a supplemental torque applied to rotary element 130 in second direction 126 in such a way that the supplemental torque and the second torque are applied simultaneously to rotate rotary element 130 in second direction 126 when the angular position of rotary element 130 is in magnetic assist portion 134 of angular range of motion 132. Additionally or alternatively, actuator assembly 120 may be configured to utilize only shape memory alloy 122, assist magnetic element 140, and receiver magnetic element 150 to generate the first torque, the second torque, and the supplemental torque.

The supplemental torque may be applied to rotary element 130 only when rotary element 130 is in a given portion and/or subset of angular range of motion 132. For example, the supplemental torque may be applied to rotary element 130 only when the angular position of rotary element 130 is in magnetic assist portion 136 of angular range of motion 134. Stated differently, actuator assembly 100 may be configured such that no significant magnetic force exists between assist magnetic element 140 and receiver magnetic element 150 when rotary element 130 is in an angular position that is within angular range of motion 132 but outside magnetic assist portion 134.

The martensite state and the austenite state of shape memory alloy element 122 may determine and/or define an angular extent of angular range of motion 132. For example, angular range of motion 132 may be bounded by a first maximum angular position 125 corresponding to first rotary direction 124 and by a second maximum angular position 127 corresponding to second rotary direction 126, The angular position of rotary element 130 may be first maximum angular position 125 when shape memory alloy element 122 is in the austenite state, and/or the angular position of rotary element 130 may be second maximum angular position 127 when shape memory alloy element 122 is in the martensite state. Additionally or alternatively, magnetic assist portion 134 of angular range of motion 132 may include second maximum angular position 127, and/or assist magnetic element 140 and receiver magnetic element 150 may be in physical contact when the angular position of rotary element 130 is in second maximum angular position 127.

As discussed, and with continued reference to FIG. 1, actuator assembly 100 includes thermal control unit 170 to regulate the temperature of at least a portion of rotary actuator 120, such as a portion that includes, or is, shape memory alloy element 122. Specifically, thermal control unit 170 may be configured to actively heat shape memory alloy element 122, such as to transform shape memory alloy element 122 from the martensite state to the austenite state and/or to generate the first torque, and/or may be configured to actively cool shape memory alloy element 122, such as to transform shape memory alloy element 122 from the austenite state to the martensite state and/or to generate the second torque. However, this is not required, and it is within the scope of the present disclosure that shape memory alloy element 122 additionally or alternatively may be configured to transform from the austenite state to the martensite state through passive cooling, such as by ceasing an active heating by thermal control unit 170.

Thermal control unit 170 may include and/or be any appropriate device to modulate and/or regulate a temperature of shape memory alloy element 122. For example, thermal control unit 170 may include a resistive heater, a conductive heater, a convective heater, a radiant heater, a Peltier device, a heat pump, and/or an inductive heater. Thermal control unit 170 may be directly coupled to shape memory alloy element 122, and/or may be configured to transmit temperature control signal 172 to rotary actuator 120 and/or shape memory alloy element 122 to regulate the temperature of shape memory alloy element 122.

Assist magnetic element 140 and/or receiver magnetic element 150 each may include and/or be any appropriate material configured to generate the magnetic force as described herein. For example, assist magnetic element 140 may include and/or be an assist permanent magnet, an assist rare earth magnet, an assist ferromagnetic material, and/or an assist electromagnet. Similarly, receiver magnetic element 150 may include and/or be a receiver permanent magnet, a receiver rare earth magnet, a receiver ferromagnetic material, and/or a receiver electromagnet.

Turning now to FIG. 3, assist magnetic element 140 may have and/or be characterized by assist magnetic moment 142, and receiver magnetic element 150 may have and/or be characterized by receiver magnetic moment 152. Assist magnetic moment 142 and/or receiver magnetic moment 152 may characterize the corresponding magnetic elements in such a way that a magnetic force between assist magnetic element 140 and receiver magnetic element 150 is generally maximized when assist magnetic moment 142 and receiver magnetic moment 152 are generally parallel and/or aligned. Thus, assist magnetic element 140 and receiver magnetic element 150 may be configured such that assist magnetic moment 142 and receiver magnetic moment 152 are generally parallel when the angular position of rotary element 130 is within magnetic assist portion 134 of angular range of motion 132 (as illustrated in FIG. 2), and/or may be configured such that assist magnetic moment 142 and receiver magnetic moment 152 are generally misaligned when the angular position of rotary element 130 is outside magnetic assist portion 134.

Additionally or alternatively, assist magnetic element 140 may have assist element surface 144 with assist element normal direction 146 that is perpendicular, or at least substantially perpendicular, to assist element surface 144. Similarly, receiver magnetic element 150 may have receiver element surface 154 with receiver element normal direction 156 that is perpendicular, or at least substantially perpendicular, to receiver element surface 154. In such a configuration, and as illustrated in FIG. 3, assist element normal direction 146 and receiver element normal direction 156 may define and/or be separated by a magnet offset angle 160.

Magnet offset angle 160 may correspond to and/or define an extent of magnetic assist portion 134 of angular range of motion 132. For example, magnet offset angle 160 may be less than a threshold magnet offset angle when the angular position of rotary element 130 is in magnetic assist portion 134, and/or magnet offset angle 160 may be greater than the threshold magnet offset angle when the angular position of rotary element 130 is outside magnetic assist portion 134. As examples, the threshold magnet offset angle may be at least 5 degrees, at least 10 degrees, at least 20 degrees, at least 30 degrees, less than 65 degrees, less than 55 degrees, less than 45 degrees, less than 35 degrees, less than 25 degrees, less than 15 degrees, and/or less than 7 degrees.

As discussed, and with reference once again to FIG. 1, actuator assembly 100 may include status signal generator 180 that is configured to generate and/or transmit a status signal 182. Status signal 182 may include and/or be any appropriate indication of a configuration, an orientation, and/or a state of actuator assembly 100. For example, status signal 182 may include information regarding the temperature of shape memory alloy element 122, a magnitude and/or a direction of external load force 234 applied to rotary element 130, the angular position of rotary element 130, and/or a magnitude of the magnetic force generated between assist magnetic element 140 and receiver magnetic element 150.

Additionally or alternatively, in a configuration in which assist magnetic element 140 includes the assist electromagnet, actuator assembly 100 may further include assist electromagnet control unit 148, which may be configured to modulate an assist magnetic field generated by the assist electromagnet, such as based on status signal 182. Similarly, in a configuration in which receiver magnetic element 150 includes the receiver electromagnet, actuator assembly 100 may further include receiver electromagnet control unit 158, which may be configured to modulate a receiver magnetic field generated by the receiver electromagnet, such as based on status signal 182. As an example, status signal 182 may include information indicating that the angular position of rotary element 130 is in magnetic assist portion 134 and that the supplemental torque must be increased in magnitude in order to rotate rotary element 130 further in second rotary direction 126 against external bias force 234. In such a case, responsive to status signal 182, assist electromagnet control unit 148 and/or receiver electromagnet control unit 158 may increase a magnitude of the magnetic field generated by the assist electromagnet and/or the receiver electromagnet, respectively, to increase the magnitude of the supplemental torque.

As schematically illustrated in FIG. 1, actuator assembly 100 additionally may include feedback control unit 190, which may be configured to receive status signal 182 and, responsive to receiving the status signal, to generate and transmit feedback control signal 192 to thermal control unit 170. Feedback control signal 192 may be configured to regulate the angular position of rotary element 130 via modulation of the temperature of shape memory alloy element 122. For example, feedback control signal 192 may include at least one command configured to regulate the first torque and/or the second torque applied to rotary element 130 by rotary actuator 120, such as to rotate rotary element 130 in first direction 124 and/or second direction 126 responsive to status signal 182. Additionally or alternatively, feedback control signal 192 may include at least one command configured to regulate the angular position of rotary element 130 via rotary actuator 120, such as to bring rotary element 130 to a desired angular position responsive to status signal 182. Specifically, feedback control signal 192 may include a command to change the temperature of shape memory alloy element 122 by a temperature adjustment interval and/or to bring the temperature of shape memory alloy element 122 to a predetermined temperature adjustment setpoint. Additionally or alternatively, in a configuration in which actuator assembly 100 includes assist electromagnetic control unit 148 and/or receiver electromagnet control unit 158, feedback control signal 192 may include a command to vary the magnitude of the magnetic force between assist magnetic element 140 and receiver magnetic element 150, such as by varying the magnetic field produced by the assist electromagnet and/or the receiver electromagnet.

FIG. 4 schematically illustrates an example of a wind tunnel 200 for testing an aerodynamic model 240 that includes actuator assembly 100. As illustrated in FIG. 4, wind tunnel 200 may include a chamber 210 extending in a longitudinal direction and an airstream source 220 configured to generate an airstream 230. Airstream 230 may have an airstream flow direction 232 that is generally parallel to the longitudinal direction of wind tunnel 200. Aerodynamic model 240 may be positioned in chamber 210 to receive aerodynamic load force 234 from airstream 230, such as to test an aerodynamic property of aerodynamic model 240. Specifically, actuator assembly 100 of aerodynamic model 240 may be configured to rotate rotary element 130 with respect to airstream flow direction 232 to test the aerodynamic property. For example, rotary element 130 may include and/or be an airfoil.

As an example, and as illustrated in dash-dot-dot lines in FIG. 4, angular range of motion 132 of rotary element 130 may include neutral position 136 at which rotary element 130 is generally parallel to airstream flow direction 232. In such a configuration, aerodynamic load force 234 may apply a load torque in second rotary direction 126 when rotary element 130 is rotated in first rotary direction 124 relative to neutral position 136, and may apply load torque in first rotary direction 124 when rotary element 130 is rotated in second rotary direction 126 relative to neutral position 136. Consequently, shape memory alloy element 122 may be configured to generate the first torque and/or the second torque to balance and/or oppose the load torque, such as to maintain rotary element 130 at a given angular position and/or to rotate rotary element 130 against aerodynamic load force 234.

As a more specific example, aerodynamic model 240 may include and/or be a model aircraft 242, and rotary element 130 may be a control surface 244 of model aircraft 242. In such a configuration, control surface 244 may rotate in first rotary direction 124 when thermal control unit 170 increases the temperature of shape memory alloy element 122, and may rotate in second rotary direction 126 when thermal control unit 170 decreases the temperature of shape memory alloy element 122. The magnetic force between assist magnetic element 140 and receiver magnetic element 150 may oppose the load torque applied in first rotary direction 124 by aerodynamic load force 234 when the angular position of rotary element 130 is in magnetic assist portion 134 of angular range of motion 132.

FIG. 5 schematically provides a flowchart that represents illustrative, non-exclusive examples of methods 300 of utilizing actuator assemblies 100 according to the present disclosure. The methods and steps illustrated in FIG. 5 are not limiting, and other methods and steps are within the scope of the present disclosure, including methods having greater than or fewer than the number of steps illustrated, as understood from the discussions herein. For example, methods 300 of utilizing actuator assembly 100 may omit each, or all, of the steps schematically illustrated in FIG. 5, and/or may include performing one or more steps illustrated in FIG. 5 in any alternative order and/or sequence.

As schematically illustrated in FIG. 5, methods 300 of rotating rotary element 230 of actuator assembly 100 through two rotary directions include providing actuator assembly 100, as indicated at 310; increasing the temperature of shape memory alloy element 122, as indicated at 320, to rotate rotary element 130 in first direction 124; and decreasing the temperature of shape memory alloy element 122, as indicated at 330, to rotate rotary element 130 in second rotary direction 126. The increasing at 320 and/or the decreasing at 330 may be performed in any appropriate manner, such as by a user inputting a command to thermal control unit 170 directly and/or by temperature control unit 170 receiving feedback control single 192 from feedback control unit 190. While methods 300 are discussed in the context of actuator assembly 100 as illustrated in FIG. 1, this is not required, and it is within the scope of the present disclosure that methods 300 of rotating rotary element 130 of actuator assembly 100 be applied to any appropriate embodiment of actuator assembly 100.

As indicated at 340 in FIG. 5, methods 300 additionally include applying the supplemental torque to rotary element 130 with assist magnetic element 140 and receiver magnetic element 150 when the angular position of rotary element 130 is in magnetic assist portion 134 of angular range of motion 132. The applying at 340 may include passively applying the supplemental torque. For example, in a configuration in which assist magnetic element 140 and receiver magnetic element 150 each do not include an electromagnet, the applying the supplemental torque may be performed automatically when assist magnetic element 140 and receiver magnetic element 150 are sufficiently proximal one another, such as when the angular position of rotary element 130 is in magnetic assist portion 134 of angular range of motion 132. Additionally or alternatively, the applying at 340 may include actively applying the supplemental torque, such as by varying the magnetic field produced by the assist electromagnet and/or the receiver electromagnet (when present), which may include varying by utilizing assist electromagnet control unit 148 and/or receiver electromagnet control unit 158.

As schematically indicated in dashed lines at 350 in FIG. 5, methods 300 additionally may include measuring the angular position of rotary element 130, such as with status signal generator 180. Responsive to the measuring at 350, methods 300 may further include repeating the increasing the temperature at 320 and/or the decreasing the temperature at 330, such as to bring rotary element 130 to an angular position setpoint. The angular position setpoint may be measured with respect to a portion of and/or an angular position within angular range of motion 132, such as neutral position 136, and/or may be measured with respect to the angular position measured at 350.

A control unit, such as assist electromagnet control unit 148, receiver electromagnet control unit 158, thermal control unit 170, and/or feedback control unit 190, may be any suitable device or devices that are configured to perform the functions of the control units discussed herein. For example, the control unit may include one or more of an electronic control unit, a dedicated control unit, a special-purpose control unit, a computer, a personal computer, a special-purpose control unit, a display device, a logic device, a memory device, and/or a memory device having non-transitory computer readable media suitable for storing computer-executable instructions for implementing aspects of systems and/or methods according to the present disclosure.

Illustrative, non-exclusive examples of inventive subject matter according to the present disclosure are described in the following enumerated paragraphs:

A1. A bi-directional rotary shape memory alloy element actuator assembly, the actuator assembly comprising:
an actuator mount;
a rotary actuator coupled to the actuator mount and configured to generate a first torque in a first rotary direction and a second torque in a second rotary direction that is opposite the first rotary direction;
a rotary element coupled to the rotary actuator, wherein the rotary element has an angular position in an angular range of motion, and further wherein the rotary element is configured to:
(i) rotate with respect to the actuator mount in the first rotary direction responsive to receipt of the first torque from the rotary actuator; and
(ii) rotate with respect to the actuator mount in the second rotary direction responsive to receipt of the second torque from the rotary actuator;
an assist magnetic element mounted to the actuator mount;
a receiver magnetic element mounted on the rotary element; and
a thermal control unit configured to regulate a temperature of at least a portion of the rotary actuator;
wherein the rotary actuator includes a shape memory alloy element configured to generate the first torque and the second torque responsive to the thermal control unit regulating a temperature of the shape memory alloy element; and wherein the assist magnetic element and the receiver magnetic element are configured to generate a magnetic force therebetween when the angular position of the rotary element is in a magnetic assist portion of the angular range of motion, wherein the magnetic assist portion is a subset of the angular range of motion.

A2. The actuator assembly of paragraph A1, wherein the rotary actuator includes a torsional rotary actuator.

A3. The actuator assembly of any of paragraphs A1-A2, wherein the rotary actuator includes a shape memory alloy torque tube.

A4. The actuator assembly of any of paragraphs A1-A3, wherein the rotary element is configured to rotate about a pivot point, and wherein the rotary actuator is disposed at the pivot point.

A5. The actuator assembly of paragraph A4, wherein the shape memory alloy element is spaced apart from the pivot point.

A6. The actuator assembly of any of paragraphs A1-A5, wherein the magnetic force is an attractive magnetic force.

A7. The actuator assembly of any of paragraphs A1-A6, wherein the magnetic assist portion includes at least one of at least 5%, at least 10%, at least 20%, at least 30%, at least 40%, at least 50%, at least 60%, at least 70%, at most 75%, at most 65%, at most 55%, at most 45%, at most 35%, at most 25%, at most 15%, and at most 7% of the angular range of motion.

A8. The actuator assembly of any of paragraphs A1-A7, wherein the magnetic force between the assist magnetic element and the receiver magnetic element is less than a threshold magnetic force when the angular position of the rotary element is outside the magnetic assist portion.

A9. The actuator assembly of paragraph A8, wherein the magnetic force between the assist magnetic element and the receiver magnetic element is a maximum magnetic force when the angular position of the rotary element minimizes a separation distance between the assist magnetic element and the receiver magnetic element, and further wherein the threshold magnetic force has a magnitude that is at least one of at most 10%, at most 9%, at most 8%, at most 7%, at most 6%, at most 5%, at most 4%, at most 3%, at most 2%, at most 1%, and at most 0.5% of a magnitude of the maximum magnetic force.

A10. The actuator assembly of any of paragraphs A1-A9, wherein the shape memory alloy element includes at least one of a binary alloy, a nickel-titanium alloy, a binary nickel-titanium alloy, a ternary alloy, a ternary alloy that includes nickel and titanium and further includes hafnium, copper, iron, silver, cobalt, chromium, or vanadium, and/or a quaternary alloy.

A11. The actuator assembly of any of paragraphs A1-A10, wherein the shape memory alloy element is configured to exhibit a two-way shape memory effect.

A12. The actuator assembly of any of paragraphs A1-A11, wherein the shape memory alloy element is configured to transform from a martensite state to an austenite state responsive to the thermal control unit increasing a temperature of the shape memory alloy element, and further wherein the shape memory alloy element is configured to transform from the austenite state to the martensite state responsive to the thermal control unit decreasing the temperature of the shape memory alloy element.

A13. The actuator assembly of paragraph A12, wherein the angular range of motion is bounded by a first maximum angular position corresponding to the first rotary direction and a second maximum angular position corresponding to the second rotary direction, wherein the angular position of the rotary element is the first maximum angular position when the shape memory alloy element is in the austenite state, and wherein the angular position of the rotary element is the second maximum angular position when the shape memory alloy element is in the martensite state.

A14. The actuator assembly of paragraph A13, wherein the assist magnetic element and the receiver magnetic element are in physical contact when the angular position of the rotary element is the second maximum angular position.

A15. The actuator assembly of any of paragraphs A13-A14, wherein the magnetic assist portion of the angular range of motion includes the second maximum angular position.

A16. The actuator assembly of any of paragraphs A12-A15, wherein the rotary actuator rotates in the first rotary direction when the shape memory alloy element transforms from the martensite state to the austenite state, and wherein the rotary actuator rotates in the second rotary direction when the shape memory alloy element transforms from the austenite state to the martensite state.

A17. The actuator assembly of any of paragraphs A1-A16, wherein the rotary element is configured to rotate in the first rotary direction when the only torsional force applied to the rotary element is the first torque applied by the rotary actuator, and wherein the rotary element is configured to rotate in the second rotary direction when the only torsional force applied to the rotary element is the second torque applied by the rotary actuator.

A18. The actuator assembly of any of paragraphs A12-A17, wherein the rotary actuator is configured to apply the first torque to the rotary element in the first rotary direction when the shape memory alloy element transforms from the martensite state to the austenite state; wherein the rotary actuator is configured to apply the second torque to the rotary element in the second rotary direction when the shape memory alloy element transforms from the austenite state to the martensite state; and wherein a first magnitude of the first torque is greater than a second magnitude of the second torque.

A19. The actuator assembly of any of paragraphs A1-A18, wherein the magnetic force is configured to apply a supplemental torque to the rotary element in the second direction, wherein the supplemental torque and the second torque are applied simultaneously to rotate the rotary element in the second direction.

A20. The actuator assembly of paragraph A19, wherein the supplemental torque is applied to the rotary element only when the angular position of the rotary element is in the magnetic assist portion of the angular range of motion.

A21. The actuator assembly of any of paragraphs A19-A20, wherein the actuator assembly utilizes only the shape memory alloy element, the assist magnetic element, and the receiver magnetic element to generate the first torque, the second torque, and the supplemental torque.

A22. The actuator assembly of any of paragraphs A1-A21, wherein the rotary actuator includes a single shape memory alloy element configured to generate both the first torque and the second torque.

A23. The actuator assembly of any of paragraphs A1-A22, wherein the thermal control unit is configured to actively heat the shape memory alloy element.

A24. The actuator assembly of any of paragraphs A1-A23, wherein the thermal control unit is configured to actively cool the shape memory alloy element.

A25. The actuator assembly of any of paragraphs A1-A24, wherein the thermal control unit includes at least one of a resistive heater, a conductive heater, a convective heater, a radiant heater, a Peltier device, a heat pump, and an inductive heater.

A26. The actuator assembly of any of paragraphs A1-A25, wherein the assist magnetic element includes at least one of an assist permanent magnet, an assist rare earth magnet, and an assist ferromagnetic material.

A27. The actuator assembly of any of paragraphs A1-A26, wherein the assist magnetic element includes an assist electromagnet.

A28. The actuator assembly of any of paragraphs A1-A27, wherein the receiver magnetic element includes at least one of a receiver permanent magnet, a receiver rare earth magnet, and a receiver ferromagnetic material.

A29. The actuator assembly of any of paragraphs A1-A28, wherein the receiver magnetic element includes a receiver electromagnet.

A30. The actuator assembly of any of paragraphs A1-A29, wherein the assist magnetic element has an assist magnetic moment, wherein the receiver magnetic element has a receiver magnetic moment, and wherein the assist magnetic element and the receiver magnetic element are configured such that the assist magnetic moment and the receiver magnetic moment are generally parallel when the angular position of the rotary element is within the magnetic assist portion, and such that the assist magnetic moment and the receiver magnetic moment are generally misaligned when the angular position of the rotary element is outside the magnetic assist portion.

A31. The actuator assembly of any of paragraphs A1-A30, wherein the assist magnetic element has an assist element surface with an assist element normal direction, wherein the receiver magnetic element has a receiver element surface with a receiver element normal direction, wherein the assist element normal direction and the receiver element normal direction are separated by a magnet offset angle, wherein the magnet offset angle is less than a threshold magnet offset angle when the angular position of the rotary element is in the magnetic assist portion of the angular range of motion, and wherein the magnet offset angle is greater than the threshold magnet offset angle when the angular position of the rotary element is outside the magnetic assist portion of the angular range of motion.

A32. The actuator assembly of paragraph A31, wherein the threshold magnet offset angle is at least one of at least 5 degrees, at least 10 degrees, at least 20 degrees, at least 30 degrees, less than 65 degrees, less than 55 degrees, less than 45 degrees, less than 35 degrees, less than 25 degrees, less than 15 degrees, and less than 7 degrees.

A33. The actuator assembly of any of paragraphs A1-A32, wherein the actuator assembly further includes a status signal generator configured to generate and transmit a status signal.

A34. The actuator assembly of paragraph A33, wherein the status signal includes information regarding at least one of the temperature of the shape memory alloy element, a/the load force applied to the rotary element, the angular position of the rotary element, the angular position of the rotary element, a/the load direction applied to the rotary element, a/the load magnitude applied to the rotary element, and a magnitude of the magnetic force generated between the assist magnetic element and the receiver magnetic element.

A35. The actuator assembly of any of paragraphs A32-A34, wherein the status signal generator includes at least one of a temperature sensor, a torque sensor, a rotary position sensor, and a magnetic force sensor.

A36. The actuator assembly of any of paragraphs A32-A35, when dependent upon paragraph A26, wherein the actuator assembly further includes an assist electromagnet control unit, wherein the assist electromagnet control unit is configured to modulate an assist magnetic field generated by the assist electromagnet based on the status signal.

A37. The actuator assembly of any of paragraphs A32-A36, when dependent upon paragraph A28, wherein the actuator assembly further includes a receiver electromagnet control unit, wherein the receiver electromagnet control unit is configured to modulate a receiver magnetic field generated by the receiver electromagnet based on the status signal.

A38. The actuator assembly of any of paragraphs A32-A37, wherein the actuator assembly further includes a feedback control unit configured to receive the status signal and, responsive to the receiving the status signal, to generate and transmit a feedback control signal to the thermal control unit to regulate the angular position of the rotary element.

A39. The actuator assembly of paragraph A38, wherein the feedback control signal includes at least one command configured to regulate at least one of the first torque applied to the rotary element by the rotary actuator and the second torque applied to the rotary element by the rotary actuator.

A40. The actuator assembly of any of paragraphs A38-A39, wherein the feedback control signal includes at least one command configured to regulate the angular position of the rotary element via the rotary actuator.

A41. The actuator assembly of any of paragraphs A38-A40, wherein the feedback control signal includes a command to at least one of:
(i) change the temperature of the shape memory alloy element by a temperature adjustment interval; and
(ii) bring the temperature of the shape memory alloy element to a temperature adjustment setpoint.

A42. The actuator assembly of any of paragraphs A38-A41, when dependent upon at least one of paragraph A27 and paragraph A29, wherein the feedback control signal includes a command to vary a/the magnitude of the magnetic force between the receiver magnetic element and the assist magnetic element.

B1. A wind tunnel for testing an aerodynamic model, the wind tunnel comprising:
a chamber extending in a longitudinal direction;
an airstream source configured to generate an airstream in the chamber with an airstream flow direction generally parallel to the longitudinal direction; and
an aerodynamic model positioned in the chamber to receive an aerodynamic load force from the airstream;
wherein the aerodynamic model includes the actuator assembly of any of paragraphs A1-A42;
and wherein the actuator assembly is configured to rotate the rotary element with respect to the airstream flow direction to test an aerodynamic property of the aerodynamic model.

B2. The wind tunnel of paragraph B1, wherein the rotary element includes an airfoil.

B3. The wind tunnel of any of paragraphs B1-B2, wherein the angular range of motion includes a neutral position in which the rotary element is generally parallel to the airstream flow direction, wherein the aerodynamic load force applies a load torque in the second rotary direction when the rotary element is rotated in the first rotary direction relative to the neutral position, wherein the aerodynamic load force applies the load torque in the first rotary direction when the rotary element is rotated in the second rotary direction relative to the neutral position, and wherein the shape memory alloy element is configured to generate at least one of the first torque and the second torque to at least one of balance the load torque and oppose the load torque.

B4. The wind tunnel of any of paragraphs B1-B3, wherein the rotary element is a control surface of a model aircraft, wherein the control surface rotates in the first rotary direction when the thermal control unit increases the temperature of the shape memory alloy element, wherein the control surface rotates in the second rotary direction when the thermal control unit decreases the temperature of the shape memory alloy element, and wherein the magnetic force between the assist magnetic element and the receiver magnetic element opposes a/the load torque in the first rotary direction when the angular position of the rotary element is in the magnetic assist portion of the angular range of motion.

C1. A method of rotating a rotary element in two rotary directions through an angular range of motion utilizing the actuator assembly of any of paragraphs A1-A42, the method comprising:
increasing the temperature of the shape memory alloy element to rotate the rotary element in the first rotary direction;
decreasing the temperature of the shape memory alloy element to rotate the rotary element in the second rotary direction; and
applying a/the supplemental torque to the rotary element with the assist magnetic element and the receiver magnetic element when the angular position of the rotary element is in the magnetic assist portion of the angular range of motion.

C2. The method of paragraph, C1, wherein the method further includes measuring the angular position of the rotary element and, responsive to the measuring, modulating the temperature of the shape memory alloy to bring the rotary element to an angular position setpoint.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A bi-directional rotary shape memory alloy element actuator assembly, the actuator assembly comprising:
a rotary actuator configured to generate a first torque in a first rotary direction and a second torque in a second rotary direction;
a rotary element coupled to the rotary actuator, wherein the rotary element has an angular position in an angular range of motion, and further wherein the rotary element is configured to:
(i) rotate in the first rotary direction responsive to receipt of the first torque from the rotary actuator; and
(ii) rotate in the second rotary direction responsive to receipt of the second torque from the rotary actuator;
an assist magnetic element; and
a receiver magnetic element mounted on the rotary element;
wherein the rotary actuator includes a shape memory alloy element configured to generate the first torque and the second torque; and wherein the assist magnetic element and the receiver magnetic element are configured to generate a magnetic force therebetween when the angular position of the rotary element is in a magnetic assist portion of the angular range of motion.

2. The actuator assembly of claim 1, wherein the shape memory alloy element is configured to transform from a martensite state to an austenite state responsive to a temperature of the shape memory alloy element increasing, wherein the shape memory alloy element is configured to transform from the austenite state to the martensite state responsive to the temperature of the shape memory alloy element decreasing, wherein the rotary actuator is configured to apply the first torque to the rotary element in the first rotary direction when the shape memory alloy element transforms from the martensite state to the austenite state, wherein the rotary actuator is configured to apply the second torque to the rotary element in the second rotary direction when the shape memory alloy element transforms from the austenite state to the martensite state, wherein the magnetic force is configured to apply a supplemental torque to the rotary element in the second rotary direction, and wherein the supplemental torque is applied to the rotary element when the angular position of the rotary element is in the magnetic assist portion of the angular range of motion.

3. The actuator assembly of claim 1, wherein the rotary actuator includes a shape memory alloy torque tube.

4. The actuator assembly of claim 1, wherein the magnetic assist portion is a subset of the angular range of motion and includes at least 5% and at most 35% of the angular range of motion.

5. The actuator assembly of claim 1, wherein the magnetic force between the assist magnetic element and the receiver magnetic element is less than a threshold magnetic force when the angular position of the rotary element is outside the magnetic assist portion, wherein the magnetic force between the assist magnetic element and the receiver magnetic element is a maximum magnetic force when the angular position of the rotary element minimizes a separation distance between the assist magnetic element and the receiver magnetic element, and further wherein a magnitude of the threshold magnetic force is at most 5% of a magnitude of the maximum magnetic force.

6. The actuator assembly of claim 1, wherein the assist magnetic element includes at least one of an assist permanent magnet, an assist rare earth magnet, an assist electromagnet, and an assist ferromagnetic material, and wherein the receiver magnetic element includes at least one of a receiver permanent magnet, a receiver rare earth magnet, a receiver electromagnet, and a receiver ferromagnetic material.

7. The actuator assembly of claim 1, wherein the assist magnetic element has an assist magnetic moment, wherein the receiver magnetic element has a receiver magnetic moment, and wherein the assist magnetic element and the receiver magnetic element are configured such that the assist magnetic moment and the receiver magnetic moment are generally parallel when the angular position of the rotary element is within the magnetic assist portion, and such that the assist magnetic moment and the receiver magnetic moment are generally misaligned when the angular position of the rotary element is outside the magnetic assist portion.

8. The actuator assembly of claim 7, wherein the assist magnetic element has an assist element surface with an assist element normal direction, wherein the receiver magnetic element has a receiver element surface with a receiver element normal direction, wherein the assist element normal direction and the receiver element normal direction are separated by a magnet offset angle, wherein the magnet offset angle is less than a threshold magnet offset angle when the angular position of the rotary element is in the magnetic assist portion of the angular range of motion, and wherein the magnet offset angle is greater than the threshold magnet offset angle when the angular position of the rotary element is not in the magnetic assist portion of the angular range of motion.

9. The actuator assembly of claim 8, wherein the threshold magnet offset angle is at least 5 degrees and less than 90 degrees.

10. The actuator assembly of claim 1, wherein the actuator assembly further includes a status signal generator configured to generate and transmit a status signal, wherein the status signal includes information regarding at least one of a temperature of the shape memory alloy element, a load force applied to the rotary element, the angular position of the rotary element, the angular position of the rotary element, a load direction applied to the rotary element, a load magnitude applied to the rotary element, and a magnitude of the magnetic force generated between the assist magnetic element and the receiver magnetic element.

11. The actuator assembly of claim 10, wherein at least one of the assist magnetic element and the receiver magnetic element includes an electromagnet, wherein the actuator assembly further includes an electromagnet control unit configured to modulate a variable magnetic field generated by the electromagnet.

12. The actuator assembly of claim 1, wherein the actuator assembly further includes an actuator mount; wherein the rotary actuator is coupled to the actuator mount; and wherein the rotary element is configured to:
(i) rotate with respect to the rotary mount in the first rotary direction responsive to receipt of the first torque from the rotary actuator; and
(ii) rotate with respect to the rotary mount in the second rotary direction responsive to receipt of the second torque from the rotary actuator.

13. The actuator assembly of claim 12, wherein the assist magnetic element is mounted to the actuator mount.

14. The actuator assembly of claim 1, wherein the actuator assembly further includes a thermal control unit configured to regulate a temperature of at least a portion of the rotary actuator.

15. A method of rotating the rotary element of claim 1 in two rotary directions through the angular range of motion, the method comprising:
increasing a temperature of the shape memory alloy element to rotate the rotary element in the first rotary direction;
decreasing the temperature of the shape memory alloy element to rotate the rotary element in the second rotary direction; and
applying a supplemental torque to the rotary element with the assist magnetic element and the receiver magnetic element when the angular position of the rotary element is in the magnetic assist portion of the angular range of motion.

16. A wind tunnel for testing an aerodynamic model, the wind tunnel comprising:
a chamber extending in a longitudinal direction;
an airstream source configured to generate an airstream in the chamber with an airstream flow direction generally parallel to the longitudinal direction; and
the aerodynamic model positioned in the chamber to receive an aerodynamic load force from the airstream;
wherein the aerodynamic model includes the actuator assembly of claim 1 configured to rotate a portion of the aerodynamic model with respect to the airstream flow direction to test an aerodynamic property of the aerodynamic model.

17. The wind tunnel of claim 16, wherein the angular range of motion includes a neutral position in which the rotary element is generally parallel to the airstream flow direction, wherein the aerodynamic load force applies a load torque in the second rotary direction when the rotary element is rotated in the first rotary direction relative to the neutral position, wherein the aerodynamic load force applies the load torque in the first rotary direction when the rotary element is rotated in the second rotary direction relative to the neutral position, and wherein the shape memory alloy element is configured to generate at least one of the first torque and the second torque to at least one of balance the load torque and oppose the load torque.

18. A method of rotating a rotary element through an angular range of motion, the method comprising:
    rotating the rotary element in a first rotary direction responsive to receipt of a first torque from a rotary actuator;
    rotating the rotary element in a second rotary direction responsive to receipt of a second torque from the rotary actuator; and
    applying a supplemental torque to the rotary element with a receiver magnetic element that is mounted on the rotary element and an assist magnetic element when an angular position of the rotary element is in a magnetic assist portion of the angular range of motion;
    wherein the rotary actuator includes a shape memory alloy element configured to generate the first torque and the second torque.

19. The method of claim 18, wherein the method further includes measuring the angular position of the rotary element and, responsive to the measuring, modulating a temperature of the shape memory alloy element to bring the rotary element to an angular position setpoint.

20. The method of claim 18, wherein the applying the supplemental torque includes passively applying the supplemental torque.

* * * * *